US011455669B2

(12) United States Patent
Nagarathinam et al.

(10) Patent No.: US 11,455,669 B2
(45) Date of Patent: Sep. 27, 2022

(54) METHOD AND APPARATUS FOR PREDICTING WAIT TIMES

(71) Applicant: Walmart Apollo, LLC, Bentonville, AR (US)

(72) Inventors: Arun Prasad Nagarathinam, Santa Clara, CA (US); Sneha Narahalli Balasubramanya, San Jose, CA (US); Madhavan Kandhadai Vasantham, Dublin, CA (US); Syed Aman, Santa Clara, CA (US); Rohit Jain, Sunnyvale, CA (US); Deepak Deshpande, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 184 days.

(21) Appl. No.: 15/884,331

(22) Filed: Jan. 30, 2018

(65) Prior Publication Data
US 2019/0236669 A1    Aug. 1, 2019

(51) Int. Cl.
*G06Q 30/06* (2012.01)

(52) U.S. Cl.
CPC ..... *G06Q 30/0613* (2013.01); *G06Q 30/0635* (2013.01)

(58) Field of Classification Search
CPC .............. G06Q 30/0613; G06Q 30/0635
USPC ................................. 705/26, 26.41
See application file for complete search history.

(56) References Cited

U.S. PATENT DOCUMENTS

| 9,204,251 B1 * | 12/2015 | Mendelson | G07F 17/246 |
| 9,456,309 B2 * | 9/2016 | Zises | H04W 4/80 |
| 10,074,084 B1 * | 9/2018 | Jhaveri | G16H 40/67 |
| 10,762,462 B1 * | 9/2020 | Hapgood | G06Q 10/0836 |
| 2006/0164259 A1 * | 7/2006 | Winkler | G08G 1/127 340/944 |

(Continued)

FOREIGN PATENT DOCUMENTS

| CA | 3095334 A1 * | 10/2019 | G06F 1/163 |
| GB | 2496264 A * | 5/2013 | G06Q 10/06 |

(Continued)

OTHER PUBLICATIONS

Bult, Muhammed et al, "LineKing: Coffee Shop Wait-Time Monitoring Using Smartphones", Oct. 2015, IEEE Transactions on Mobile Computing, vol. 14, No. 10 (Year: 2015).*

(Continued)

*Primary Examiner* — Matthew E Zimmerman
*Assistant Examiner* — Thomas Joseph Sullivan
(74) *Attorney, Agent, or Firm* — Duane Morris LLP; Manita Rawat (57) ABSTRACT

A system is provided and generally includes a server (e.g., application server), an associate computing device, and a client computing device. The server can receive a user arrival notification that indicates a user has arrived to pick up purchased goods. The server can transmit a scan initiation request to a remote terminal that causes the remote terminal to scan at least one network. The server can receive scan data for the scanned network from the remote terminal indicating, for example, a signal strength of that network. The server can determine a current wait time based on the received scan data for the scanned network, and can transmit the current wait time to the remote terminal.

17 Claims, 6 Drawing Sheets

(56) References Cited

U.S. PATENT DOCUMENTS

| | | | | |
|---|---|---|---|---|
| 2009/0281817 | A1* | 11/2009 | Ferrara | G06Q 30/02 705/1.1 |
| 2009/0287350 | A1* | 11/2009 | Johnson | G07F 11/62 715/702 |
| 2014/0180848 | A1* | 6/2014 | Argue | G07G 1/01 705/16 |
| 2015/0081348 | A1* | 3/2015 | Avera | G06Q 10/02 705/5 |
| 2015/0081474 | A1* | 3/2015 | Kostka | H04W 88/08 705/26.8 |
| 2015/0334523 | A1* | 11/2015 | Lappetelainen | H04W 4/80 455/456.1 |
| 2016/0063435 | A1* | 3/2016 | Shah | G06Q 20/42 705/44 |
| 2016/0148238 | A1* | 5/2016 | He | G06Q 30/0207 705/14.1 |
| 2016/0192149 | A1* | 6/2016 | Zises | H04W 4/027 455/456.3 |
| 2017/0098264 | A1* | 4/2017 | Priebatsch | G06Q 20/3224 |
| 2017/0171849 | A1* | 6/2017 | Bolin | H04W 72/0446 |
| 2019/0130322 | A1* | 5/2019 | Chen | G06Q 10/109 |
| 2019/0172123 | A1* | 6/2019 | Pugh | G06F 16/24 |
| 2019/0228463 | A1* | 7/2019 | Chan | G06Q 30/0621 |
| 2019/0311629 | A1* | 10/2019 | Sierra | H04W 4/023 |

FOREIGN PATENT DOCUMENTS

| | | | | |
|---|---|---|---|---|
| WO | WO-2012170958 | A1 * | 12/2012 | H04M 3/5238 |
| WO | WO-2019183732 | A1 * | 10/2019 | G07C 9/27 |

OTHER PUBLICATIONS

Bulut Muhammed et al, "LineKing: Crowdsourced Line Wait-Time Estimation using Smartphones", 2013, Mobile Computing, Applications, and Services. MobiCASE 2012. Lecture Notes of the Institute for Computer Sciences, Social Informatics and Telecommunications Engineering, vol. 110 (Year: 2013).*

Zhang, Ye, et al, "Wait Time Prediction: How to Avoid Waiting in Lines?", Sep. 2013, UbiComp'13 (Year: 2013).*

Smith, Jeffrey, et al, "Estimating and Interpreting the Waiting Time for Customers Arriving to a Non-Stationary Queueing System", 2015, IEEE: proceedings of the 2015 Winter Simulation Conference (Year: 2015).*

Nirenberg, Samantha, et al, "The Impact of Queue Length Rounding and Delayed App Information on Disney World Queues", 2015, IEEE: Proceedings of the 2015 Winter Simulation Conference (Year: 2018).*

Xu, Xiaowei, "Development of a new mobile application to predict theme park waiting time", 2013, Iowa State University (Year: 2013).*

* cited by examiner

METHOD AND APPARATUS FOR PREDICTING WAIT TIMES

TECHNICAL FIELD

The disclosure relates generally to customer service and, more specifically, to customer service wait times.

BACKGROUND

At least some known online retailers allow customers to place purchase orders remotely through a purchasing system. For example, some retailers use at least some known purchasing systems that allow customers to place purchase orders through the retailer's website. As another example, some retailers allow customers to place purchase orders through an application ("App") that executes on a mobile device, such as a cellular phone. Often times, the purchasing system provides an option to the customer to have the purchased items delivered to an address, such as to the customer's home address. At least some known purchasing systems, however, provide an option to allow the customer to pick up the purchased goods at a store location. For example, the customer can select a store location when making the purchase, and have the retailer gather the goods and have them ready for customer pickup. Some purchasing systems allow the customer to check-in ahead of time to let the retailer know the customer is on their way to pick up the purchased goods at a store location.

In some examples, when the customer arrives at the store, the customer parks their vehicle and walks into the store. The customer then proceeds to customer service to pick up their purchased goods. Often times, the customer has to wait in line for an associate to help them with their purchase order. These customer service experiences, however, have drawbacks. For example, the amount of time before an associate is ready to assist a customer may be substantially long, or the customer may be unaware of how long they must wait before the associate is ready to help them with their order.

SUMMARY

The embodiments described herein can enable customers to become aware of expected wait times, and can provide a more efficient means for a customer to pick up purchased goods from a store. In various embodiments, systems and methods are provided that automatically generate expected wait times for users picking up purchased goods based on arrival at a predetermined location. The systems and methods described herein, advantageously assist customers and store personnel in completing transactions for in store pickup items by efficiently executing and organizing store pickup requests which ultimately decreases wait time by consolidating consumer interactions.

For example, in some embodiments, a system is provided that includes a server (e.g., application server) and a remote terminal. The server can (e.g., is configured to) receive a user arrival notification from the remote terminal indicating that a user has arrived to pre-defined location. The server can transmit a scan initiation request to the remote terminal that causes the remote terminal to scan at least one network. The server can receive scan data for the scanned network from the remote terminal indicating a signal strength of the network. The server can then determine a current wait time based on the received scan data. For example, the server can determine a distance of the remote terminal to the pre-defined location based on the received scan data, and can then determine the current wait time based on an estimated wait time associated with the determined distance of the remote terminal to the pre-defined location. The server can transmit the current wait time to the remote terminal.

In some embodiments, a method by a server includes receiving a user arrival notification that indicates the user has arrived to a pre-defined location. The method can include transmitting a scan initiation request to a remote terminal that causes the remote terminal to scan at least one network. The method can include receiving scan data for the scanned network from the remote terminal, where the scan data indicates a signal strength of the scanned network. The method can include determining a current wait time based on the received scan data, and transmitting the current wait time to the remote terminal.

In some embodiments, a non-transitory, computer-readable storage medium includes executable instructions that, when executed by one or more processors, cause the one or more processors to receive a user arrival notification that indicates a user has arrived to a pre-defined location. The executable instructions, when executed by the one or more processors, can also cause the one or more processors to transmit a scan initiation request to a remote terminal that causes the remote terminal to scan at least one network. The executable instructions, when executed by the one or more processors, can also cause the one or more processors to receive from the remote terminal scan data for the scanned network indicating a signal strength of the scanned network. The executable instructions, when executed by the one or more processors, can also cause the one or more processors to determine a current wait time based on the received scan data, and to transmit the current wait time to the remote terminal.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
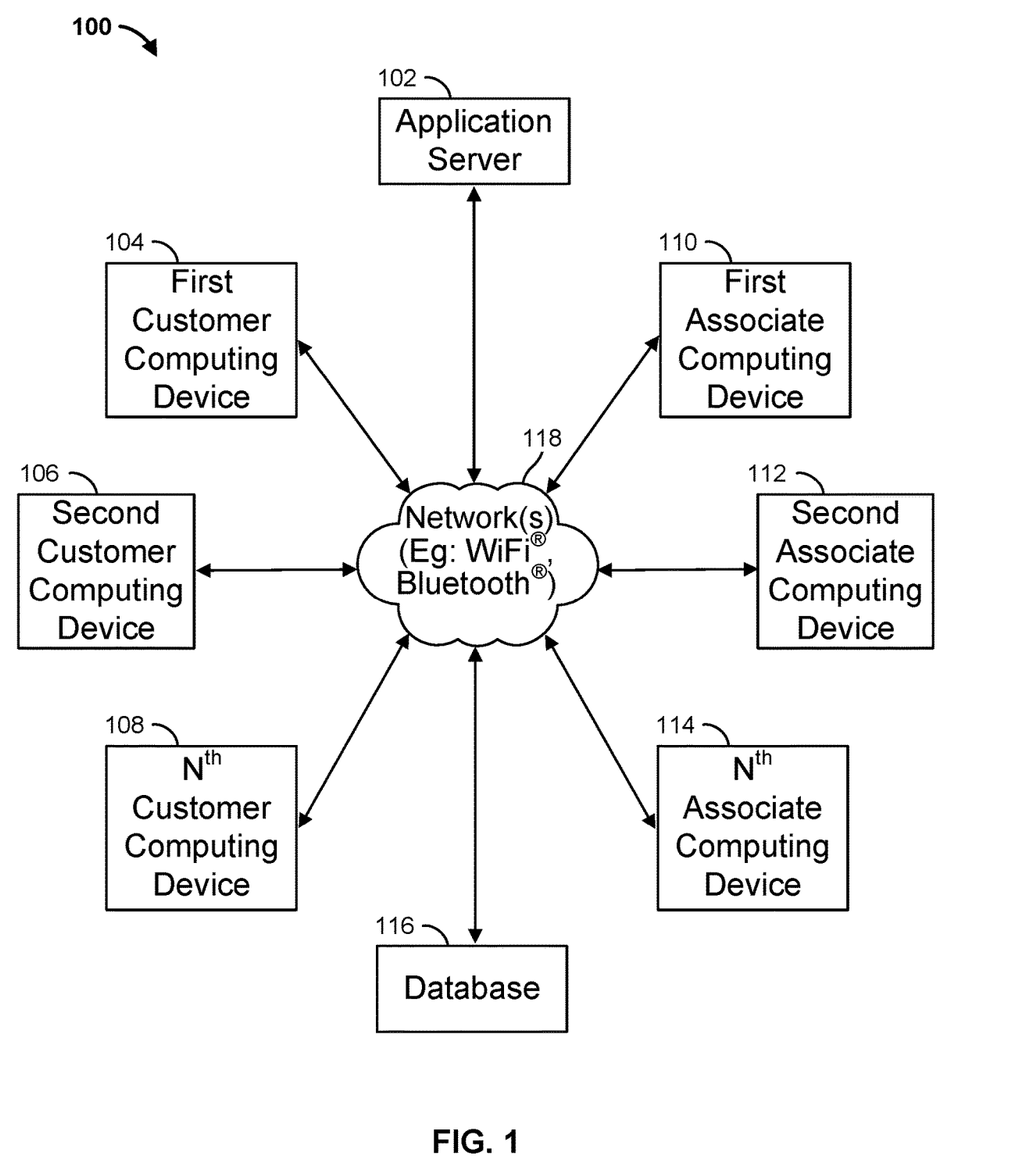
FIG. 1 is a block diagram of a system in accordance with some embodiments.

The embodiments described herein provide for automatically generating expected wait times for users picking up purchased goods based on arrival at a pre-defined location (e.g., store or business where goods are being picked up). The systems and methods described herein, advantageously assist customers and store personnel in completing transactions for in store pickup items by efficiently executing and organizing store pickup requests which ultimately decreases wait time by consolidating consumer interactions. Turning to the drawings, FIG. 1 illustrates a block diagram of a system 100 that includes application server 102, multiple customer computing devices (e.g., remote terminals) 104, 106, 108, multiple associate computing devices 110, 112, 114, and database 116, each operably connected to network 118. Application server 102, first customer computing device 104, second customer computing device 106, Nth customer computing device 108, first associate computing device 110, computing device 112, and computing device 114 can each be any suitable computing device that includes any hardware or hardware and software combination for processing and handling information. In addition, each can transmit data to, and receive data from, network 118. For example, each of application server 102, multiple customer computing devices 104, 106, 108, and multiple associate computing devices 110, 112, 114 can be a computer, a workstation, a laptop, a mobile device such as a cellular phone, a cloud-based server, or any other suitable device. Each can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 104, 106, 108, computer system 100 can include any number of customer computing devices 104,106, 108. Similarly, although FIG. 1 illustrates three associate computing devices 110, 112, 114, computer system 100 can include any number of associate computing devices 110, 112, 114.

Application server 102 can be a server operated by a retailer. Customer computing devices 104, 106, 108 can be computing devices operated by customers of a retailer. Associate computing devices 110, 112, 114 can be computing devices operated by associates (e.g., employees) of the retailer.

Application server 102 is operable to communicate with database 116 over network 118. For example, application server 102 can store data to, and read data from, database 116. Database 116 can be a remote storage device, such as a cloud-based server, a memory device on another application server, a networked computer, or any other suitable remote storage. Although shown remote to application server 102, in some examples database 116 can be a local storage device, such as a hard drive, a non-volatile memory, or a USB stick. For example, database 116 can be a storage device local to application server 102.

Network(s) 118 can include one or more networks that allow for communication among devices. For example, network 118 can include a WiFi® network, a Bluetooth® network, a satellite network, a cellular network such as a 3GPP® network, or any other suitable network. Network(s) 118 can provide access to, for example, the Internet.

Application server 102 can also communicate with first customer computing device 104, second customer computing device 106, and Nth customer computing device 108 over network 118. Similarly, first customer computing device 104, second customer computing device 106, and Nth customer computing device 108 are operable to communicate with application server 102 over network 118. For example, application server 102 can receive data (e.g., messages) from, and transmit data to, first customer computing device 104, second customer computing device 106, and Nth customer computing device 108.

Application server 102 is also operable to communicate with first associate computing device 110, second associate computing device 112, and Nth associate computing device 114. For example, application server 102 can receive data from, and transmit data to, first associate computing device 110, second associate computing device 112, and Nth associate computing device 114.

System 100 allows a customer to receive an estimated wait time when they are ready to pick up purchased goods from a retailer. For example, a customer can place an order with a retailer for the purchase of goods (e.g., groceries). When the customer is ready to pick-up the purchased goods, the customer can cause customer computing device 104, 106, 108 to send a purchase order check-in notification to server application server 102. The purchase order check-in notification indicates to server 102 that the customer is or will be on their way to pick up purchased goods. In response, application server 102 can transmit to the customer computing device 104, 106, 108 an estimated service time. The estimated service time can be an expected wait time for a particular time on a particular day.

The estimated service time can be based on, for example, historical wait time data. Historical wait time data can include customer wait times at different times of the day (e.g., for every 15 minutes, every hour, etc.) for the various days of the week. For example, server 102 can obtain historical wait time data from database 116 for a day and time corresponding to when server 102 receives the purchase order check-in notification. Server 102 can then provide the estimated service time to customer computing device 104, 106, 108 based on the obtained historical wait time data.

System 100 can also allow a customer to receive updated wait time information once the customer arrives at the retailer's store location to pick up the purchased goods. For example, when the customer arrives at the store location, customer computing device 104, 106, 108 can transmit an indication to server 102 that the customer has arrived. The server 102 can then request customer computing device 104, 106, 108 to scan one or more networks to obtain scan data (e.g., network metrics).

For example, the retailer's store location can provide one or more WiFi® access points at various locations throughout the store. Customer computing device 104, 106, 106 can scan one or more of WiFi® networks to obtain one or more network metrics such as signal strength data (e.g., received signal strength indication (RSSI), access point data, frequency (e.g., in MHz), service set identifier (SSID), basic service set identifier (BSSID), and a timestamp of the scan. Customer computing device 104, 106, 108 may store the obtained network metric information in memory. Customer computing device 104, 106, 108 can transmit the scan data to the server 102.

Server 102 can then determine or update a current wait time based on the obtained network metrics. For example, server 102 can calculate a distance of the customer computing device 104, 106, 108 to a WiFi® access point providing the network corresponding to the obtained network metrics. The distance can be determined based on distances associated with signal strengths. For example, a store can be "fingerprinted" whereby network signal strengths are predetermined. The network signal strengths can be measured at various locations within the store, and can be stored in database 116. Server 102 can then determine a distance of the customer computing device 104, 106, 108 by comparing the received signal strength to the measured signal strengths stored in database 116. In some examples, server 102 calculates the distance using a free space path loss algorithm based on received RSSI data. By way of example, according to some embodiments, server 102 calculates the distance by determining the attenuation of radio energy between feedpoints of two antennas that results from the combination of the receiving antenna's capture area plus the obstacle free, line-of-sight path through free space (e.g., air). In various embodiments, geolocation may be used to calculate distance as described above. One or ordinary skill in the art would understand that various methods may exists to calculate distance between a customer computing device 104, 106, 108 and a pre-defined location as described in various embodiments throughout this application.

Based on the calculated distance to the WiFi® access point, server 102 can determine the current wait time. For example, server 102 can obtain historical wait time data from database 116 for the current day and time. Server 102 can then provide the estimated service time to customer computing device 104, 106, 108 based on the obtained historical wait time data.

In some examples, server 102 can determine that the customer is moving within the store based on the BSSID. For example, if the BSSID changes (e.g., customer computing device 104, 106, 108 has disconnected from one WiFi® network and is now on another WiFi® network with a different BSSID), server 102 can determine the customer has now moved to an area covered by the network associated with the more recent BSSID.

In some examples, server 102 can request customer computing device 104, 106, 108 to scan one or more Bluetooth® networks to obtain network metrics. For example, the retailer's store location can provide one or more Bluetooth® access points at various locations throughout the store. In some examples, the Bluetooth® access points provide beacon signals along a customer wait line to a checkout counter where customers pickup purchased goods. For example, the Bluetooth® access points can be positioned such that each Bluetooth® access point provides a beacon signal to an area along the customer wait line. In some examples, positions further away from the checkout counter where customers pick up purchased goods have longer wait times than positions closer to the checkout counter. For example, while a first Bluetooth® access point can provide a beacon signal to positions further away from the checkout counter, a second Bluetooth® access point can provide a beacon signal to positions closer to the checkout counter. As described above, one of ordinary skill in the art would understand that Bluetooth networks may be positioned as necessary to perform the functions identified in the embodiments and examples above.

Customer computing device 104, 106, 106 can scan one or more of the Bluetooth® networks to obtain one or more Bluetooth® scan data (e.g., network metrics). For example, customer computing device 104, 106, 108 can obtain network metrics such as a beacon identifier (e.g., universally unique identifier (UUID)), signal strength data, and a timestamp of the scan. Customer computing device 104, 106, 108 can transmit the scan data to the server 102.

Database 116 can store historical wait time data for various distances from each Bluetooth® access point (e.g., positions along the customer wait line, or customer queue position). For example, database 116 can store historical wait time data for various positions (e.g., queue positions) along a customer wait line, where a Bluetooth® access point provides coverage (e.g., its beacons signal) to one or more positions. Each position of the customer wait line can correspond to an area of the store. The historical wait time data can also be based on the day of the week, and time of day. For example, database 116 can store wait times for various positions along the customer wait line at fifteen minute intervals for each hour of each day of the week.

In one example with five positions, position 1 can correspond to an area of the store closest to the checkout counter, and position 5 can correspond to an area of the store furthest from the checkout counter. A first Bluetooth® access point may provide coverage to positions 1 and 2, and a second Bluetooth® access point may provide coverage to positions 3, 4, and 5. Database 116 can store historical wait time data for each position, where the historical wait time data is based on an average amount of time it takes a customer to arrive at the checkout counter from that position. For example, the historical wait time data may indicate that from position 1, a customer will wait approximately two minutes; from position 2, approximately five minutes; from position 3, approximately eight minutes, from position 4, approximately eleven minutes, and from position five, approximately fifteen minutes.

Server 102 can obtain from database 116 the historical wait time data corresponding to the current position of customer computing device 104, 106, 108 along the customer wait line. For example, the scan data obtained from customer computing device 104, 106, 108 can indicate that customer computing device 104, 106, 108 is currently connected to the second Bluetooth® access point covering positions 3, 4, and 5. Sever 102 can calculate a distance of the customer computing device 104, 106, 108 to this second Bluetooth® access point. Server 102 can calculate the distance using a free space path loss algorithm based on received signal strength data. Based on the calculated distance, server 102 can determine a position of customer computing device 104, 106, 108 along the customer wait line. In this example, server 102 may determine that customer computing device 104, 106, 108 is at one of positions 3, 4, and 5. Server 102 can then determine or update a current wait time based on the determined position by obtaining historical wait time information from database 116 for the position determined.

In some examples, server 102 can track the amount of time it takes for a customer to reach the checkout counter from each positions. For example, server 102 can determine a timestamp associated with when customer computing device 104, 106, 108 first enters a position along the customer wait line. The timestamp can be based on when the server 102 receives network metrics from the customer computing device 104, 106, 108 for that position. The timestamp information can be stored, for example, in database 116. Once the server 102 determines that the customer computing device 104, 106, 108 has moved to a different position, server 102 can determine how long customer computing device 104, 106, 108 was in the previous position. Server 102 can store the amount of time customer computing device 104, 106, 108 was in the previous position in database 116.

Once a customer picks up the purchased goods, an associate computing device 110, 112, 114 can send a notification that the purchased goods have been delivered to server 102. Server 102 can then determine how long, for each position along the customer wait line customer computing device 104, 106, 108 entered, the wait time was before the purchased goods were delivered to the customer. Server 102 can then update the historical wait time data within database 116. For example, server 102 may update the historical wait time data by calculating a running average wait time before customers arrive at a checkout location from each position of the customer wait line. While one example of historical data is described above, server 102 may be configured to maintain historical data from any portion of the customer interaction associated with the purchase and delivery of items as would be understood by one of ordinary skill in the art to improve the customer experience and/or efficiency.

Figure 2:
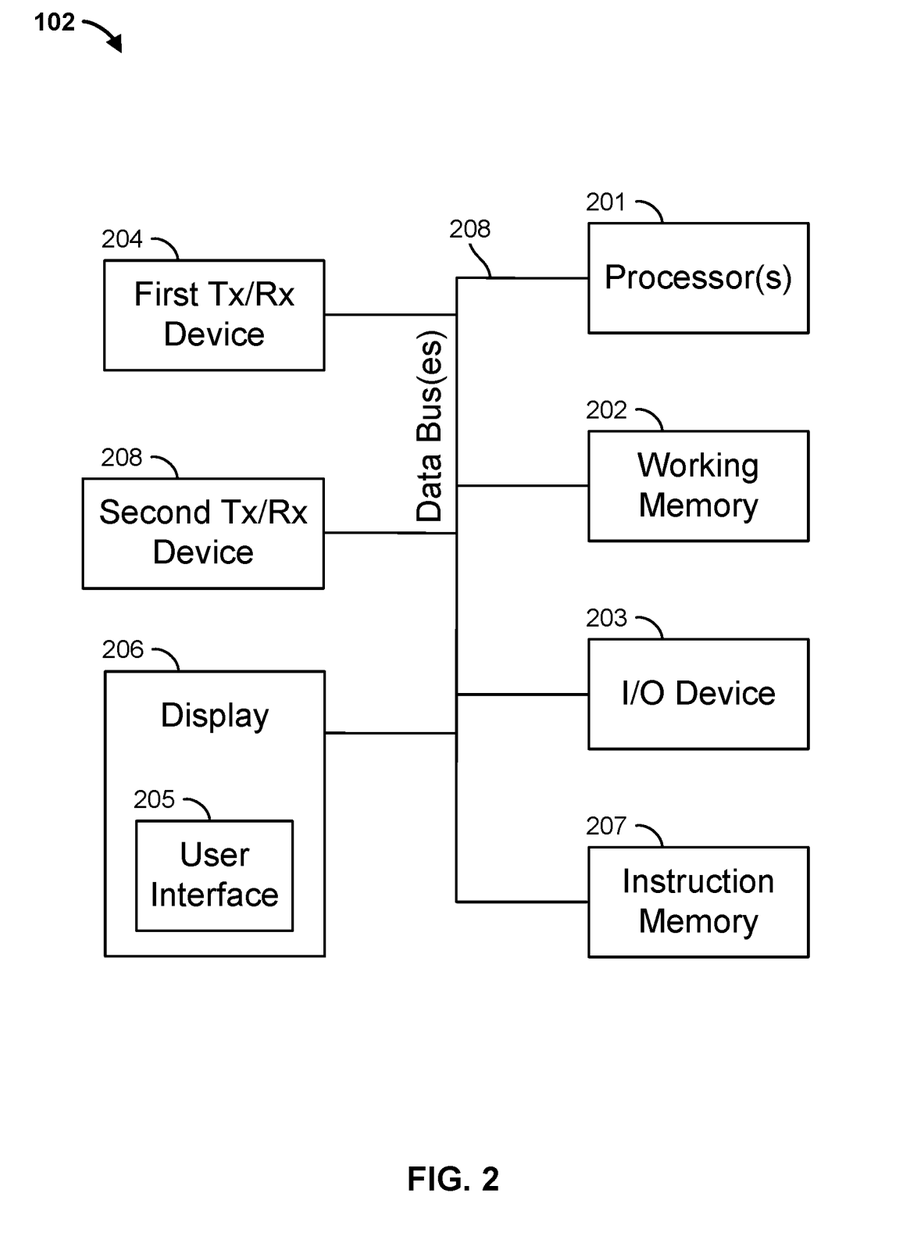
FIG. 2 is a block diagram of a server of the system of FIG. 1 in accordance with some embodiments.

FIG. 2 illustrates the application server 102 of FIG. 1. Application server 102 can include one or more processors 201, working memory 202, one or more input/output devices 203, instruction memory 207, a first transceiver 204, a second transceiver 208, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processor(s) 201 are configured to perform a certain function or operation by executing code, stored on instruction memory 207, embodying the function or operation. For example, processor(s) 201 can be configured to perform one or more of any function, method, or operation disclosed herein.

Instruction memory 207 can store instructions that can be accessed (e.g., read) and executed by processor(s) 201. For example, instruction memory 207 can include read-only memory (ROM) such as electrically erasable programmable read-only memory (EEPROM), flash memory, a removable disk, CD-ROM, any non-volatile memory, or any other suitable memory.

Processor(s) 201 can store data to, and read data from, working memory 202. For example, processor(s) 201 can store a working set of instructions to working memory 202, such as instructions loaded from instruction memory 207. Processor(s) 201 can also use working memory 202 to store dynamic data created during the operation of application server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Display 206 can display user interface 205. User interface 205 can enable user interaction with application server 102. In some examples, a user can interact with user interface 205 by engaging input-output devices 203. Display 206 can be any suitable display. For example, display 206 can be a computer monitor. In some examples, display 206 includes a touchscreen.

First transceiver 204 allows for communication with a network, such as a network of network(s) 118 of FIG. 1. Similarly, second transceiver 208 allows for communication with a network, such as another network of network(s) 118 of FIG. 1. In some examples, first transceiver 204 and second transceiver 206 are selected based on the type of network(s) 118 application server 102 will be operating in. For example, first transceiver 204 can allow communications with a WiFi® network, while second transceiver 208 can allow for communications with a Bluetooth® network. Processor(s) 201 is operable to receive data from, or send data to, a network via one or more of first transceiver 204 and second transceiver 208.

Figure 3:
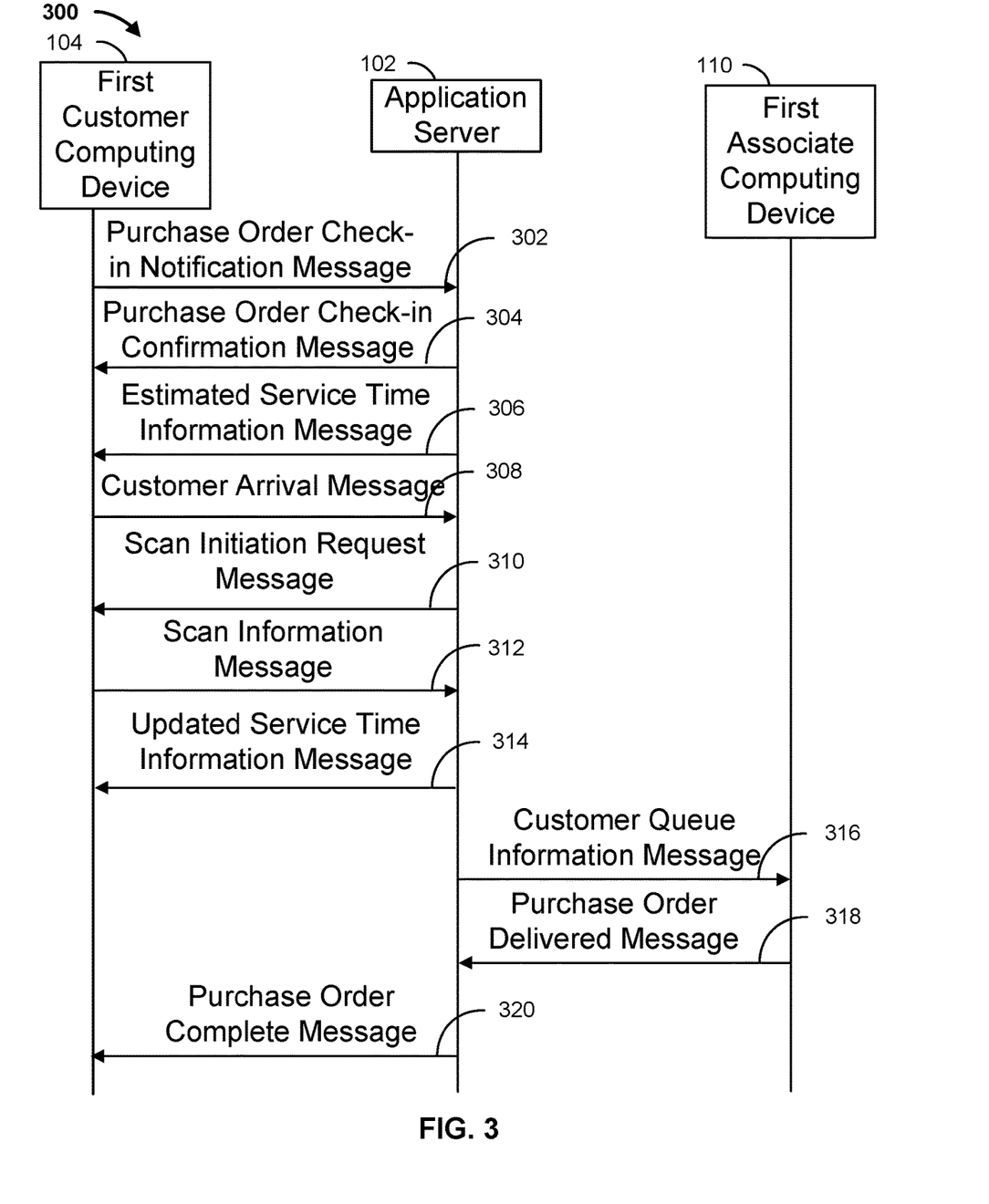
FIG. 3 illustrates a messaging scheme among devices of FIG. 1 in accordance with some embodiments.

FIG. 3 illustrates an example messaging scheme 300 among first customer computing device 104, application server 102, and first associate computing device 110. To begin, first customer computing device 104 transmits a purchase order check-in notification message 302 to application server 102. The purchase order check-in notification message 302 can notify the retailer that the customer is on their way to pick up purchased good associated with a purchase order. In response, application server 102 can transmit a purchase order check-in confirmation message 304 to first customer computing device 104, confirming that purchase order check-in notification message 302 was received.

Application server 102 also transmits an estimated service time information message 306 to first customer computing device 104. The estimated service time information message 306 includes an estimated wait time that the customer may need to wait to receive the purchased goods once they arrive at the store. The estimated service time can be an expected wait time for the day and time that the customer is picking up the purchased goods. The estimated service time can be based on, for example, historical wait time data.

Once the customer arrives at the store location, first customer computing device 104 transmits a customer arrival message 308 to application server 102, indicating that the customer has arrived at the store location. In response, application server 102 transmits a scan initiation request message 310 to first customer computing device 104. The scan initiation request message 310 can include one or more requests to scan one or more networks, such as WiFi® or Bluetooth® networks. First customer computing device then scans one or more of the networks to obtain scan data (e.g., network metrics). First customer computing device 104 then transmits the scan data to server 102 in scan information message 312.

Upon receiving scan information message 312, application server 102 can determine an estimated wait time based on the received scan data. For example, application server 102 can update the estimated wait time previously sent to first customer computing device 104 in the estimated service time information message 306. Application server 102 transmits the estimated wait time to application server 102 in updated service time information message 314.

In some examples, application server 102 and first customer computing device 104 periodically repeat the messaging described with respect to scan initiation request message 310, scan information message 312, and updated service time information message 314. For example, application server 102 may initiate the messaging scheme by transmitting scan initiation request message 310 every minute, five minutes, ten minutes, or at any other suitable frequency. In some examples, first customer computing device 104 periodically transmits scan information messages 312 upon receiving a scan initiation request message 310. For example, scan initiation request message 310 may include a frequency of how often scan information message 312 should be sent. First customer computing device 104 then transmits scan information message 312 at the requested frequency. In response, application server 102 transmits updated service time information message 314 at the same or different frequency.

Application server 102 also transmits customer queue information message 316 to first associate computing device 110. The customer queue information message 316 can include a queue position of first customer computing device 104 along the customer wait line. The customer queue information message 316 can also include the estimated wait time for first customer computing device 104. One of ordinary skill in the art would understand that an associate computing device may comprise various aspects of customer queue information as necessary for information, efficiency, and improvement of customer-employee interaction.

Once the customer arrives at the checkout counter and receives the purchased goods, first associate computing device 110 transmits purchase order delivered message 318 to application server 102. Purchase order delivered message 318 can indicate to application server 102 that the purchased goods have been delivered to (e.g., picked up by) the customer. Application server 102 can update a customer queue by removing the customer and associated purchase order from the customer queue when the purchase order delivered message 318 is received. Application server 102 can also transmit a purchase order complete message 320 to first customer computing device 104. Purchase order complete message 320 can indicate to first customer computing device 104 that the purchased goods have been received by the customer.

Figure 4:
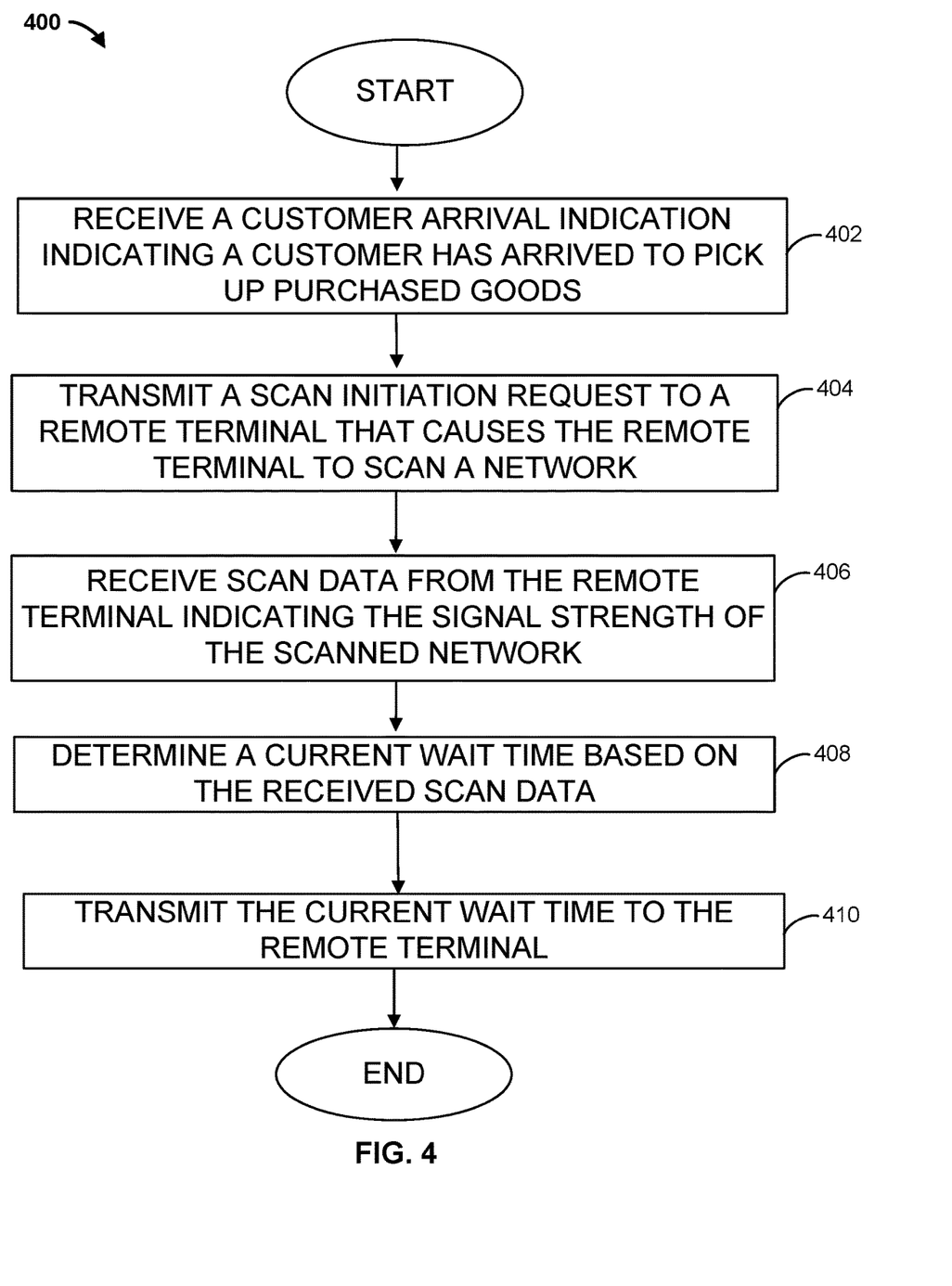
FIG. 4 is a flowchart of an example method that can be carried out by the server of FIG. 1 in accordance with some embodiments.

FIG. 4 is a flowchart of an example method 400 that can be carried out by a server, such as application server 102 of FIG. 1. At step 402, the server receives a customer arrival indication from a remote terminal indicating a customer has arrived to a pre-defined location (e.g., store or business where goods are being picked up). For example, the customer arrival indication can be received in the customer arrival message 308 of FIG. 3. At step 404, the server transmits a scan initiation request to the remote terminal. The scan initiation request causes the remote terminal to scan a network. For example, the server can send the scan initiation request in the scan initiation request message 310 of FIG. 3. At step 406, the server receives scan data from the remote terminal. The scan data indicates the signal strength of a scanned network. For example, the server can receive the scan initiation request in the scan information message 312 of FIG. 3. At step 408, the server determines a current wait time based on the received scan data. For example, the server can determine a distance of the remote terminal to a location based on the signal strength of the scanned network. The location can be, for example, a location within a store where the customer is to pick up purchased goods. The server can then search a database for an estimated wait time associated with the determined distance of the remote terminal to the location. The server can determine that the current wait time is the estimated wait time associated with the determined distance of the remote terminal. At step 410, the server transmits the current wait time to the remote terminal.

Figure 5:
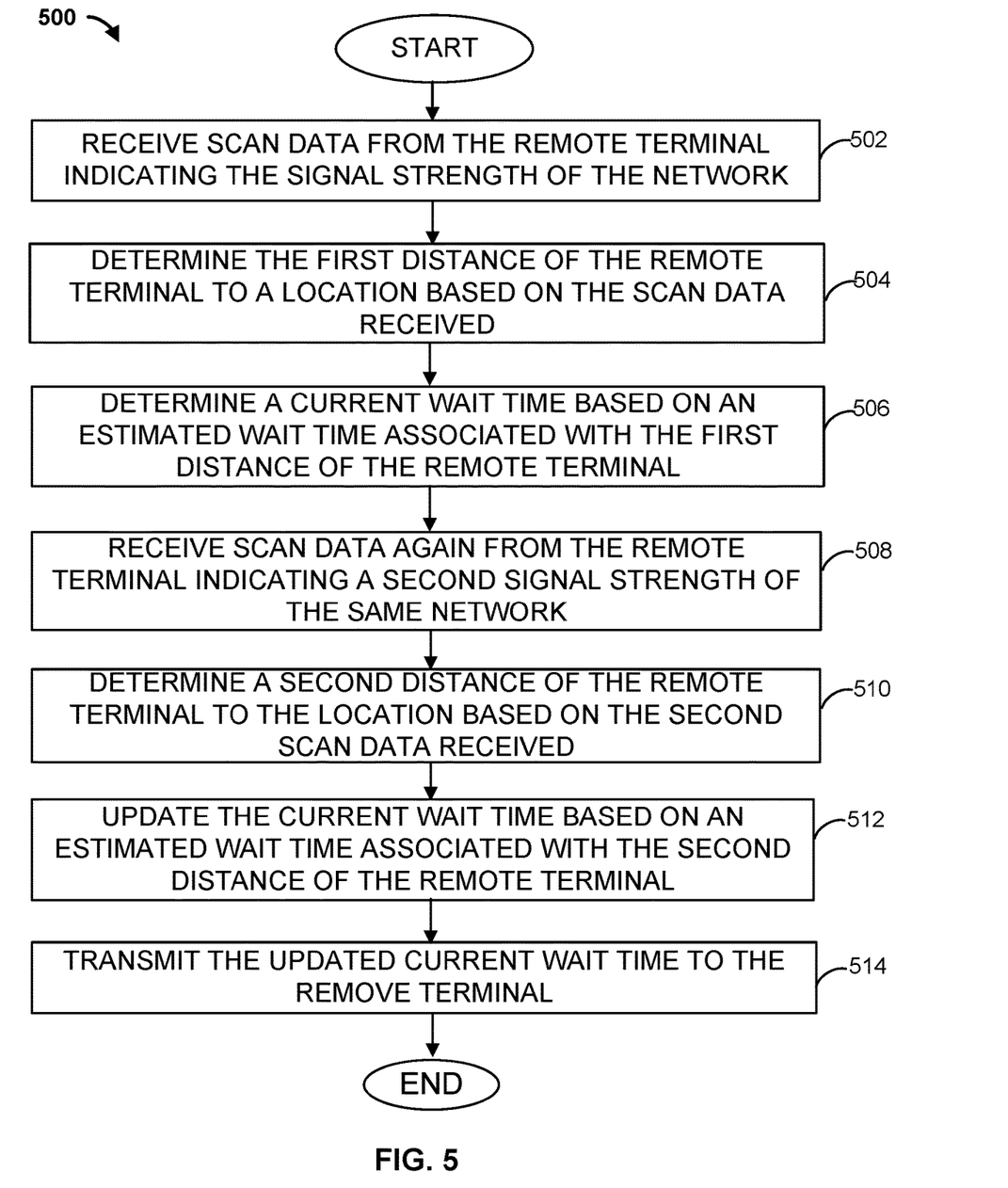
FIG. 5 is a flowchart of another example method that can be carried out by the server of FIG. 1 in accordance with some embodiments.

FIG. 5 is a flowchart of an example method 500 that can be carried out by a server, such as application server 102 of FIG. 1. At step 502, the server receives scan data from a remote terminal indicating the signal strength of a network. At step 504, the server determines a first distance of the remote terminal to a location based on the scan data received. The location can be, for example, a location within a store where the customer is to pick up purchased goods. At step 506, the server determines a current wait time based on an estimated wait time associated with the first distance of the remote terminal. At step 508, the server receives scan data again from the remote terminal. This more recent scan data indicates a second signal strength of the same network. At step 510, the server determines a second distance of the remote terminal to the location based on the more recent scan data received. For example, the second distance can be a shorter distance to a pickup location than the first distance, which may indicate the customer is moving closer to the pickup location. At step 512, the sever updates the current wait time based on an estimated wait time associated with the second distance of the remote terminal. At step 514, the server transmits the updated current wait time to the remote terminal. In some examples, steps 508, 510, 512, and 514 repeat periodically until the customer arrives at the location.

Figure 6:
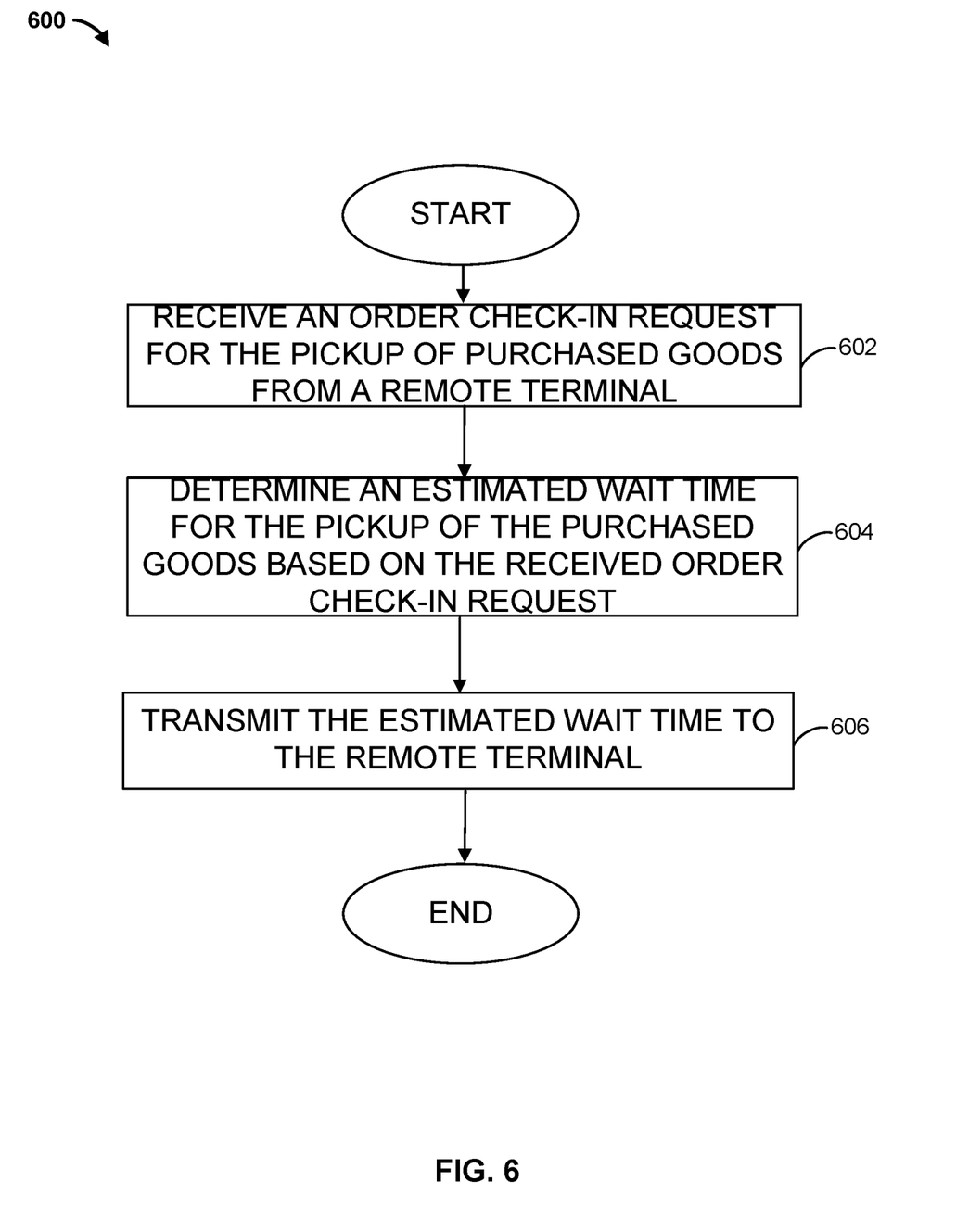
FIG. 6 is a flowchart of yet another example method that can be carried out by the server of FIG. 1 in accordance with some embodiments.

FIG. 6 is a flowchart of another example method 600 that can be carried out by a server, such as the application server 102 of FIG. 1. At step 602, the server receives an order check-in request for the pickup of purchased goods from a remote terminal. At step 604, the server determines an estimated wait time for the pickup of the purchased goods based on the received order check-in request. For example, a database can contain estimated wait times associated with the time of day for one or more days of the week. The server can obtain from the server an estimated wait time associated with the current day and time. At step 606, the server transmits the estimated wait time to the remote terminal.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable (e.g., computer-readable) storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising a server configured to:
   receive an order check-in message notification indicating an initiation of a pickup of purchased goods from a remote terminal;
   determine an estimated wait time for the pickup of the purchased goods based on the received order check-in message notification;
   transmit the estimated wait time to the remote terminal;
   receive an arrival notification that indicates a user has arrived to a pre-defined location;
   transmit a scan initiation request to the remote terminal that causes the remote terminal to scan at least one network;
   receive first scan data for a first network of the at least one network from the remote terminal indicating a signal strength of the first network;
   determine a current day and a current time;
   determine a time interval based on the current time;
   obtain historical wait time data for the first network of the at least one network based on the current day and the time interval;
   determine a current wait time based on the received first scan data and the historical wait time data for the first network;
   transmit the current wait time to the remote terminal;
   transmit a delivered message to the remote terminal in response to receiving an order delivered message;
   update the historical wait time data for the first network of the at least one network based on the current wait time and a time associated with the order delivered message being received, the historical wait time data corresponding to the current day and the time interval, and the historical wait time data being updated by calculating a running average wait time, for each user queue position of a set of user queue positions, based on receiving the order check-in message notification and a corresponding user queue position; and
   update a user queue by removing the purchased goods from the user queue when the order delivered message is received.

2. The system comprising a server of claim 1 wherein, to determine the current wait time, the server is configured to:
   determine a first distance of the remote terminal to the pre-defined location based on the received first scan data; and
   determine the current wait time based on a first estimated wait time associated with the determined first distance of the remote terminal.

3. The system comprising a server of claim 2 wherein the server is further configured to:
   receive second scan data for the first network of the at least one network from the remote terminal indicating a second signal strength of the first network;
   determine a second distance of the remote terminal to the pre-defined location based on the received second scan data;
   determine an updated current wait time based on a second estimated wait time associated with the determined second distance of the remote terminal; and
   transmit the updated current wait time to the remote terminal.

4. The system comprising a server of claim 3, wherein the server is further configured to:
   determine a calculated wait time based on the determined first distance and the determined second distance; and
   update at least one of the first estimated wait time and the second estimated wait time based on the determined calculated wait time.

5. The system comprising a server of claim 2 wherein the server is further configured to:
   receive scan data for a second network of the at least one network from the remote terminal indicating a signal strength of the second network;
   determine a second distance of the remote terminal to the pre-defined location based on the received scan data for the second network;
   determine an updated current wait time based on a second estimated wait time associated with the determined second distance of the remote terminal; and
   transmit the updated current wait time to the remote terminal.

6. The system comprising a server of claim 1, wherein the server is further configured to:
   determine a user queue position based on the current wait time; and
   transmit the user queue position to an associate computing device.

7. The system comprising a server of claim 1, wherein the server is further configured to:
   receive a purchase order delivery notification from an associate computing device indicating that purchased goods have been delivered to the user; and
   based on the received purchase order delivery notification, transmit a purchase order complete notification to the remote terminal indicating that the purchase order is complete.

8. The system comprising a server of claim 1, wherein the scan initiation request comprises a frequency of how often the first scan data is to be received.

9. A method comprising:
   receiving an order check-in message notification indicating an initiation of a pickup of purchased goods from a remote terminal;
   determining an estimated wait time for the pickup of the purchased goods based on the received order check-in message notification;
   transmitting the estimated wait time to the remote terminal;
   receiving a user arrival notification that indicates a user has arrived to a pre-defined location;
   transmitting a scan initiation request to the remote terminal that causes the remote terminal to scan at least one network;
   receiving first scan data for a first network of the at least one network from the remote terminal indicating a signal strength of the first network;
   determining a current day and a current time;
   determining a time interval based on the current time;

obtaining historical wait time data for the first network of the at least one network based on the current day and the time interval;

determining a current wait time based on the received first scan data and the historical wait time data for the first network;

transmitting the current wait time to the remote terminal;

transmitting a delivered message to the remote terminal in response to receiving an order delivered message;

updating the historical wait time data for the first network of the at least one network based on the current wait time and a time associated with the order delivered message being received, the historical wait time data corresponding to the current day and the time interval, and the historical wait time data being updated by calculating a running average wait time, for each user queue position of a set of user queue positions, based on receiving the order check-in message notification and a corresponding user queue position; and updating a user queue by removing the purchased goods from the user queue when the order delivered message is received.

10. The method of claim 9 wherein determining the current wait time comprises:

determining a first distance of the remote terminal to the pre-defined location based on the received first scan data; and determining the current wait time based on a first estimated wait time associated with the determined first distance of the remote terminal.

11. The method of claim 10 further comprising:

receiving second scan data for the first network of the at least one network from the remote terminal indicating a second signal strength of the first network;

determining a second distance of the remote terminal to the pre-defined location based on the received second scan data;

determining an updated current wait time based on a second estimated wait time associated with the determined second distance of the remote terminal; and transmitting the updated current wait time to the remote terminal.

12. The method of claim 11 further comprising:

determining a calculated wait time based on the determined first distance and the determined second distance; and updating at least one of the first estimated wait time and the second estimated wait time based on the determined calculated wait time.

13. The method of claim 10 further comprising:

receiving scan data for a second network of the at least one network from the remote terminal indicating a signal strength of the second network;

determining a second distance of the remote terminal to the pre-defined location based on the received scan data for the second network;

determining an updated current wait time based on a second estimated wait time associated with the determined second distance of the remote terminal; and transmitting the updated current wait time to the remote terminal.

14. A non-transitory, computer-readable storage medium comprising executable instructions that, when executed by one or more processors, cause the one or more processors to:

receive an order check-in message notification indicating an initiation of a pickup of purchased goods from a remote terminal;

determine an estimated wait time for the pickup of the purchased goods based on the received order check-in message notification;

transmit the estimated wait time to the remote terminal;

receive a user arrival notification that indicates a user has arrived to a pre-defined location;

transmit a scan initiation request to the remote terminal that causes the remote terminal to scan at least one network;

receive first scan data for a first network of the at least one network from the remote terminal indicating a signal strength of the first network;

determine a current day and a current time;

determine a time interval based on the current time;

obtain historical wait time data for the first network of the at least one network based on the current day and the time interval;

determine a current wait time based on the received first scan data and the historical wait time data for the first network;

transmit the current wait time to the remote terminal;

transmit a delivered message to the remote terminal in response to receiving an order delivered message;

update the historical wait time data for the first network of the at least one network based on the current wait time and a time associated with the order delivered message being received, the historical wait time data corresponding to the current day and the time interval, and the historical wait time data being updated by calculating a running average wait time, for each user queue position of a set of user queue positions, based on receiving the order check-in message notification and a corresponding user queue position; and update a user queue by removing the purchased goods from the user queue when the order delivered message is received.

15. The computer-readable storage medium of claim 14 wherein the executable instructions, when executed by the one or more processors, cause the one or more processors to:

determine a first distance of the remote terminal to the pre-defined location based on the received first scan data; and determine the current wait time based on a first estimated wait time associated with the determined first distance of the remote terminal.

16. The computer-readable storage medium of claim 15 wherein the executable instructions, when executed by the one or more processors, cause the one or more processors to:

receive second scan data for the first network of the at least one network from the remote terminal indicating a second signal strength of the first network;

determine a second distance of the remote terminal to the pre-defined location based on the received second scan data;

determine an updated current wait time based on a second estimated wait time associated with the determined second distance of the remote terminal; and transmit the updated current wait time to the remote terminal.

17. The computer-readable storage medium of claim 15 wherein the executable instructions, when executed by the one or more processors, cause the one or more processors to:

receive scan data for a second network of the at least one network from the remote terminal indicating a signal strength of the second network;

determine a second distance of the remote terminal to the pre-defined location based on the received scan data for the second network;
determine an updated current wait time based on a second estimated wait time associated with the determined second distance of the remote terminal; and
transmit the updated current wait time to the remote terminal.

* * * * *